Sept. 2, 1952 — C. E. GREENE ET AL — 2,608,896
PATTERN TRACER ASSEMBLY
Filed June 13, 1947 — 3 Sheets-Sheet 1
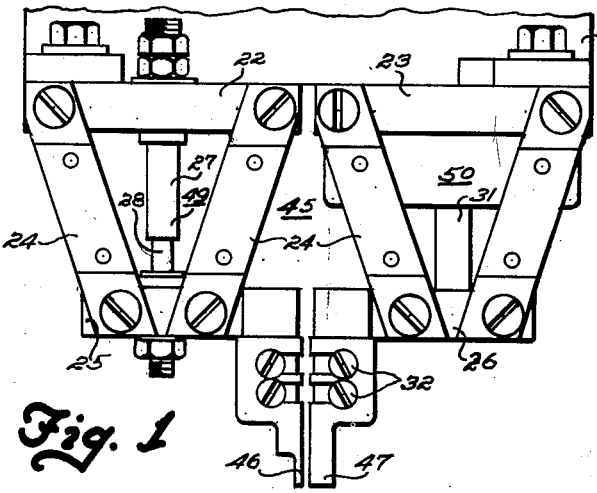
Fig. 1
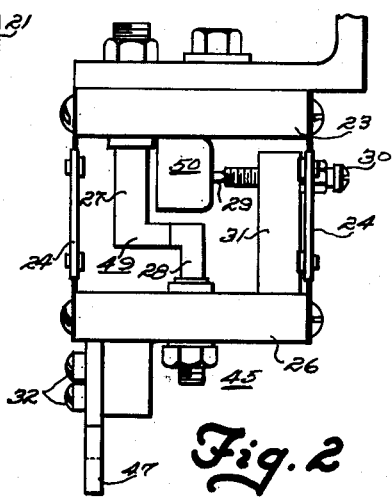
Fig. 2
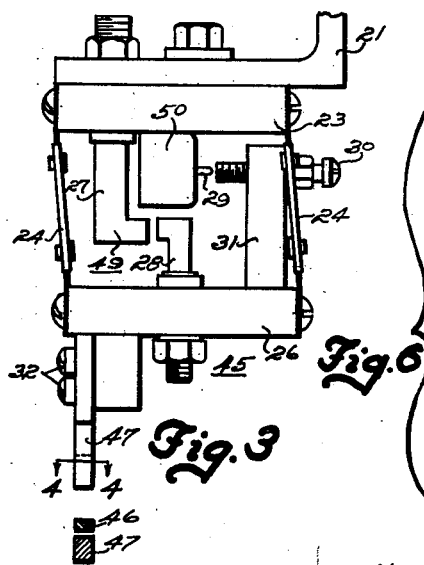
Fig. 3
Fig. 4
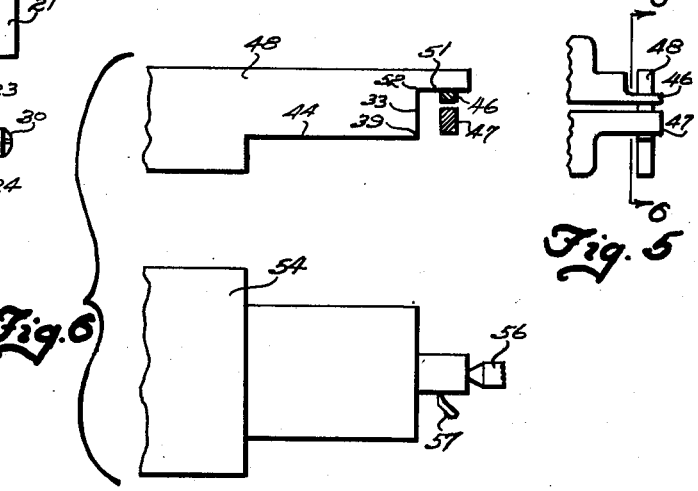
Fig. 5
Fig. 6
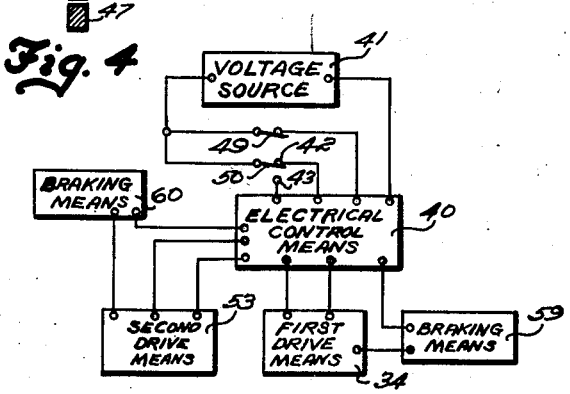
Fig. 13
Fig. 8
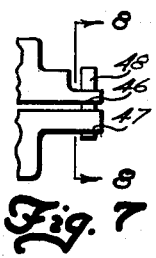
Fig. 7
INVENTOR.
CLAUDE E. GREENE
ROBERT B. LESHER
BY
Hoodling and Krost
attys

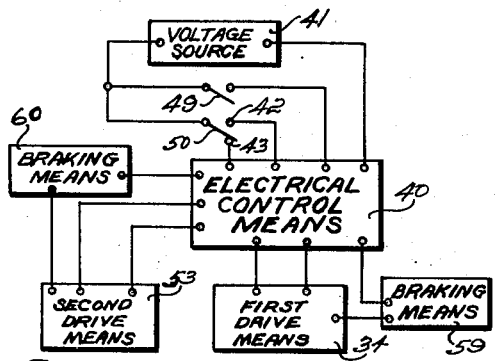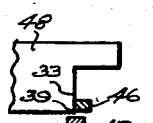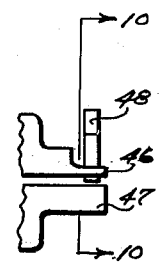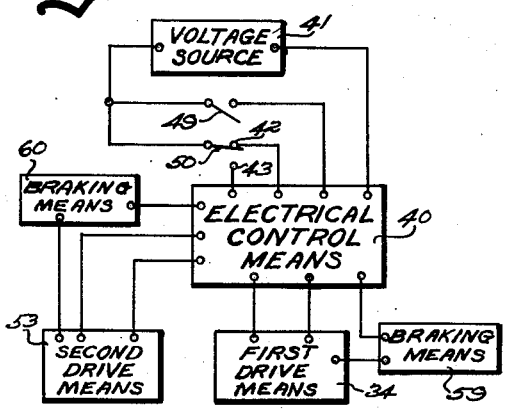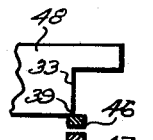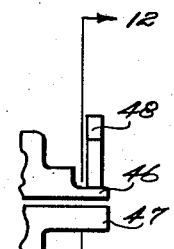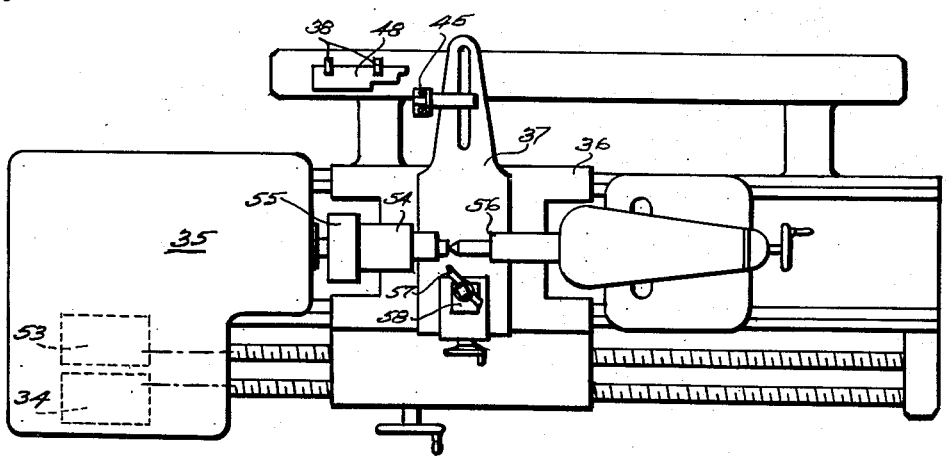

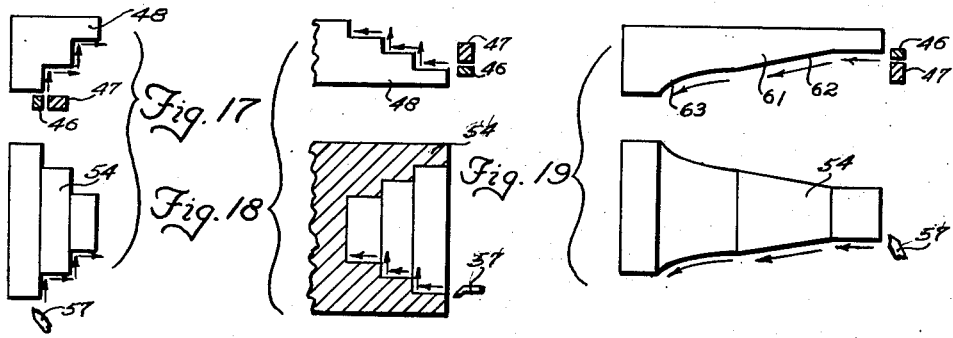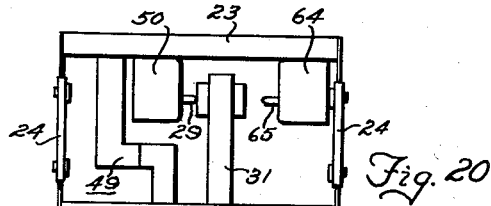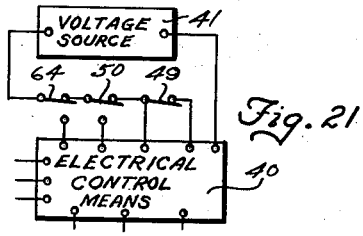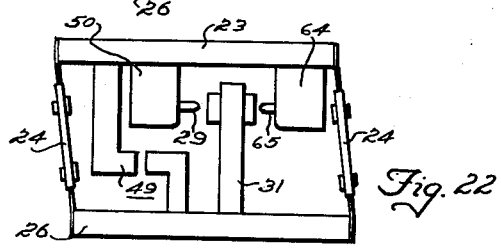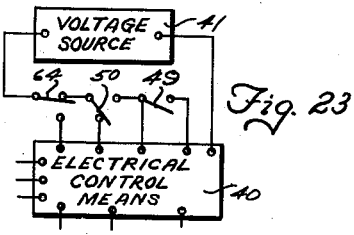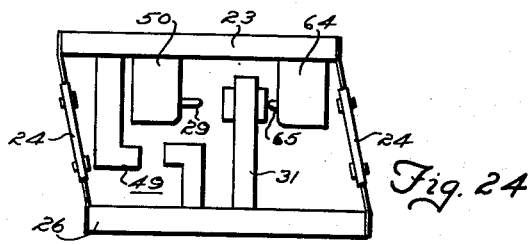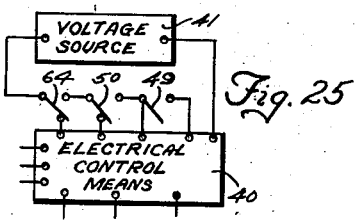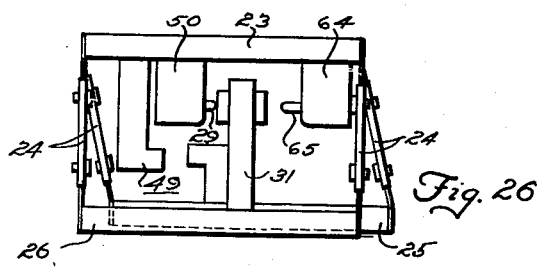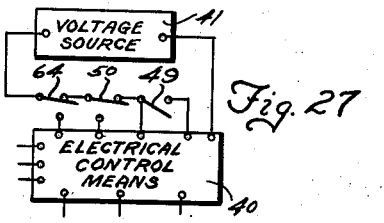

Patented Sept. 2, 1952

2,608,896

UNITED STATES PATENT OFFICE 2,608,896

PATTERN TRACER ASSEMBLY

Claude E. Greene and Robert B. Lesher, Sidney, Ohio, assignors to The Monarch Machine Tool Company, a corporation of Ohio Application June 13, 1947, Serial No. 754,553

4 Claims. (Cl. 82—14)

1

The invention relates in general to measuring devices, and more particularly to tracer assemblies for a pattern.

An object of the invention is a measuring device that quickly and accurately obtains a dimension of an object being measured.

Another object of the invention is a measuring device that provides for quickly scanning the greater part of a dimension to be measured and provides for slowly scanning the remaining part of the dimension to obtain greater accuracy.

Another object of the invention is the provision of a control system for a machine wherein two scanning means are used to obtain intelligence from a pattern such that the relative position of the two scanning means and the pattern governs the operating conditions of the machine.

Another object of the invention is the provision of a control system for a machine wherein two scanning means are used to obtain intelligence from a pattern such that high speed of the machine is obtainable when accuracy is not of prime importance and slow speed is obtainable at or near those places where accuracy is important.

Another object of the invention is to provide two speeds to the cross wise speed of a lathe such that accurate sizing of the diameter of the workpiece can be obtained.

Another object of the invention is to provide two fingers contactively scanning a template for selecting traverse, feed or zero speed conditions of the cross slide of a lathe.

Another object of the invention is the provision of two scanning means of a pattern for governing the size of a workpiece on a lathe such that the two scanning means are aligned parallel to the cross slide movement to provide a traverse speed for the cross slide upon impingement of the pattern by both scanning means, to provide a slower speed for the cross slide upon impingement of the pattern by only one scanning means, and to provide a zero speed for the cross slide when both scanning means are out of impingement with said pattern.

Another object of the invention is the provision of a rapid and slow speed of the cross-slide of a lathe wherein the rapid speed is established on the outward movement until shortly before a change in direction is reached, then providing a slow speed on the outward movement so that accurate sizing of the diameter of the shoulder may be obtained.

Another object of the invention is the provision of two scanning means for a pattern for governing the movements of two relatively movable

2 parts of a machine such that the two scanning means are aligned parallel to the line of relative movement to provide a high speed of relative movement upon impingement of the pattern by both scanning means, to provide a slower speed of relative movement upon impingement of the pattern by only one scanning means, and to provide a zero speed of relative movement when both scanning means are out of impingement with the pattern.

Another object of the invention is the provision of two scanning means for a pattern for governing the size of a workpiece on a lathe such that the two scanning means are aligned parallel to the carriage movement to provide a rapid speed for the carriage upon impingement of the pattern by both scanning means, to provide a slower feed speed for the carriage upon impingement of the pattern by only one scanning means, and to provide a zero speed for the carriage when both scanning means are out of impingement with said pattern.

Another object of the invention is to provide three speed conditions to the carriage of a lathe such that accurate sizing of a faceplate workpiece can be obtained.

Another object of the invention is to provide two fingers contactively scanning a pattern for selecting feed-left, feed-left slow, and zero speed conditions of the carriage of a lathe.

Another object of the invention is the provision of a pattern controlled tracer assembly having two scanning means for actuating at least three switch means whereby the switch means provides three speed conditions each to the carriage and cross-slide of a lathe.

Another object of the invention is the provision of a control system for use with a machine having two parts individually movable relative to the machine wherein two scanning means are used to obtain intelligence from a pattern such that high speed of each movable part is obtainable when accuracy is not of prime importance and slow speed of each movable part is obtainable at or near those places where accuracy is important.

Other objects and a fuller understanding of the invention may be had by referring to the following description and claims, taken in conjunction with the accompanying drawing, in which:

Figure 1 is a side view of the preferred embodiment of the tracer assembly in a normal position;

Figure 2 is a front view of the tracer assembly of Figure 1;

Figure 3 is a front view of the tracer assembly in an actuated position;

Figure 4 is a cross-sectional view of the contact fingers of the tracer assembly taken on the line 4—4 of Figure 3;

Figure 5 is a side view of the pattern being contacted by the two contact fingers of the tracer assembly;

Figure 6 is a plan view of the pattern and contact fingers taken on the line 6—6 of Figure 5 and showing a workpiece as shaped by said pattern;

Figure 7 is another side view of the pattern and contact fingers with the contact fingers moved to an intermediate position;

Figure 8 is a plan view of the pattern and the two contact fingers as taken along the line 8—8 of Figure 7;

Figure 9 is a side view of the pattern and contact fingers in a third position;

Figure 10 is a plan view of part of the pattern and the two contact fingers taken along the line 10—10 of Figure 9;

Figure 11 is a side view of the pattern and contact fingers as restored to the first position;

Figure 12 is a plan view of part of the pattern and the two contact fingers taken along the line 12—12 of the Figure 11;

Figure 13 is a diagrammatic illustration of an electrical control circuit for use with the tracer assembly with switch means positioned in accordance with the contact fingers as shown in Figures 5 and 6;

Figure 14 is another diagrammatic illustration of the electrical control circuit with the switch means positioned in accordance with the contact fingers as shown in Figures 7 and 8;

Figure 15 is a further diagramatic illustration of the electrical control circuit with the switch means positioned in accordance with the contact fingers as shown in Figures 9 and 10;

Figure 16 is a plan view of a lathe incorporating the tracer assembly and pattern to control the lathe;

Figure 17 is a plan view of part of the pattern and contact fingers and showing a face plate being shaped by the pattern;

Figure 18 is a plan view of part of the pattern and contact fingers and showing a step-boring operation as controlled by the pattern;

Figure 19 is a plan view of part of the pattern and contact fingers and showing a workpiece having tapered and curved surfaces being shaped by the pattern;

Figure 20 is a diagrammatic side view of a tracer assembly having three switch means controlled by the two contact fingers;

Figure 21 is a diagrammatic illustration of an electrical control circuit with the switch means positioned in accordance with the tracer assembly as shown in Figure 20;

Figure 22 is another diagrammatic illustration of the tracer assembly of Figure 20 in a second position;

Figure 23 is another diagrammatic illustration of the electrical control circuit of Figure 21 with the switch means positioned in accordance with the tracer assembly as shown in Figure 22;

Figure 24 is another diagrammatic illustration of the tracer assembly of Figure 20 in a third position;

Figure 25 is another diagrammatic illustration of the electrical control circuit of Figure 21 with the switch means positioned in accordance with the tracer assembly as shown in Figure 24;

Figure 26 is another diagrammatic illustration of the tracer assembly of Figure 20 in a fourth position; and Figure 27 is another diagrammatic illustration of the electrical control circuit of Figure 21 with the switch means positioned in accordance with the tracer assembly as shown in Figure 26.

In many machines that are controlled by a pattern and a tracer assembly, a considerable difficulty has been experienced in obtaining both speed and accuracy in the operation of the machine. To achieve a greater degree of accuracy, the common expedient has been to slow down the machine so that more accurate control of the work or tool in relation to each other is obtainable. The present invention treats the problem in a new manner, for example, in those operations that do not require great accuracy, fast cycling is permitted. While at or near those critical points in the cycle of operation where accuracy is required, the feed speed of the machine is reduced in order to obtain this greater degree of accuracy.

The present invention has wide application to measuring devices in general, where a given dimension is to be measured with great accuracy, but which may quickly be accomplished considering such accuracy. The present invention is applicable to all types of machines that are controllable by a pattern and some form of tracer assembly or scanning means. This would include all forms of material forming or working machinery, and specifically such machines as engine lathes, shapers or milling machines. The preferred embodiment of the tracer assembly has been chosen to be shown as being used with an engine lathe, but it is to be understood that this is done merely as an example, and the present invention is not to be limited to such a narrow scope.

The Figure 1 shows the preferred embodiment of the tracer assembly 45 which includes a first scanning means or finger means 46 and a second scanning means or finger means 47. The first and the second scanning means 46 and 47 may take any number of a wide variety of forms, but the preferred embodiment has been shown as having the scanning means 46 and 47 in the form of finger means or a contact finger that contacts or impinges upon the controlling surface, outline or contour of the pattern 48 for obtaining intelligence from the pattern 48 by such scanning. The pattern 48 may take the form of a template or other controlling form. In the preferred embodiment of the invention, the scanning means 46 and 47 are shown as actuating first and second switch means 49 and 50 respectively. Many forms of the switch arrangement are feasible and practical. The preferred embodiment of the invention shows the tracer assembly 45 as including a mounting means 21, first and second support insulators 22 and 23 carried by the mounting means 21, spring legs 24 depending from the support insulators 22 and 23, first and second tables 25 and 26 carried by the spring legs 24, the first and second scanning means 46 and 47 carried, respectively, by the first and second tables 25 and 26, and the first and second switch means 49 and 50 mounted, respectively, between the first and second support insulators 22 and 23 and the first and second tables 25 and 26. The spring legs 24 are formed of thin strips of elastic material such that the first and second tables 25 and 26 are free to move to the right and to the left as viewed in the Figure 2, but for all practical purposes have no movement in or out of the plane of the paper as shown in that Figure 2. The first and second switch means 49 and 50 are then adapted to be actuated by this right and left movement. The switch means 49 and 50 may take any of a number of various forms, and two different forms are shown in the drawing. The first switch means 49 is shown as having an upper contact 27 depending from the first support insulator 22 and a lower contact 28 carried by the first table 25. The second switch means 50 is shown as an enclosed switch with a small actuating member 29 that is responsive to minute changes of movement. Such switches are commercially available in a variety of forms. The actuating member 29 is adapted to be actuated by an adjusting screw 30 carried by a post 31, which in turn is carried by the second table 26. The construction of the second switch means 50 is such that the actuating member 29 is urged outwardly from the enclosing casing by the urging of an internal spring means. In connection with the tracer assembly 45, the first and second switch means 49 and 50 have first and second electrical conditions, represented as a normal or first position and an actuated or second position, with the normal position being that as shown in the Figure 2, that is, with the spring legs 24 in a normal position with no external force to distort or change the position of the tables 25 and 26. In this normal position, the first switch means 49 is closed, that is, the upper contact 27 is touching the lower contact 28. The second switch means 50 has the actuating member 29 depressed by the adjusting screw 30 and the post 31 for this normal position of the second switch means 50. The actuated position of the first and second switch means 49 and 50 is brought about by moving the respective tables 25 and 26 to the right as viewed in the Figure 2, and results in the position shown in Figure 3. This actuated position causes the first switch means 49 to be opened, that is, the upper contact 27 is out of contact with the lower contact 28. The actuated position for the second switch means 50 is established when the second table 26 is moved to the right, as viewed in Figures 2 and 3, so that the adjusting screw 30 and the post 31 carried by the table 26 are also moved to the right, thus permitting the actuating member 29 to move outwardly under the urging of the internal spring of the switch means 50. The first and second scanning means or finger means 46 and 47 are shown as being dependently carried from the tables 25 and 26. Adjusting screws 32 are provided so that the two finger means 46 and 47 may be adjusted in spacing relative to each other. The Figure 4 shows a cross-sectional plan view of these first and second scanning means 46 and 47, and the Figures 5 and 6 show the relationship of the scanning means 46 and 47 to the template or pattern 48, and the tool and workpiece governed thereby. The finger means 46 and 47 are carried by the mounting means 21 such that the finger means 46 and 47 are aligned parallel to a straight control surface 33 of the template 48, as best shown in the Figure 6. The straight control surface 33 has a first end or shoulder 39 and a second end or shoulder 52. A second control surface 44 is positioned at an angle to the straight control surface 33 with the shoulder 39 positioned therebetween. A third control surface 51 is positioned adjacent the other end 52 of the straight control surface 33. In this preferred embodiment of the invention, the second and third control surfaces are parallel, and are positioned perpendicular to the straight control surface 33. A first drive means or motive means 34 is provided to move the tracer assembly 45 in a direction parallel to the alignment of the first and second finger means 46 and 47, and toward the first end or shoulder 39. Additional means 53 are employed to move the mounting means 21 at an angle to the alignment of the first and second scanning means 46 and 47. In the specific example of the engine lathe, such additional means 53 would be a second drive means 53 to move the carriage 36. The Figure 16 shows the tracer assembly and pattern as mounted on an engine lathe 35. The engine lathe 35 has a carriage 36 and a cross-slide 37, with the first drive means 34 adapted to move the cross-slide 37 for in-and-out transverse movements, and the second drive means 53 adapted to move the carriage 36 for right-and-left longitudinal movements. The tracer assembly 45 is mounted, by the mounting means 21, upon the cross-slide 37. The pattern 48 is mounted upon a stationary portion of the engine lathe 35 by the mounting means 38. Means is provided for bringing the tracer assembly 45 into a position such that the first and second scanning means 46 and 47 operatively contact or impinge the straight control surface 33. In the engine lathe 35, this last mentioned means could be the second drive means 53.

Figure 16 also shows a workpiece 54 as being supported between a headstock 55 and a tailstock 56, and being formed by a tool 57 held in a toolholder 58. The shape of the workpiece 54 is governed by the tracer assembly 45 as controlled by the pattern 48. The two scanning means 46 and 47 are designed to give two-speed operation to the first drive means 34 when moving toward the front of the lathe 35. The movement of the carriage is sufficient to bring the first and second scanning means 46 and 47 into operative contact with the straight control surface 33 such that the contact fingers 46 and 47 cause the switch means 49 and 50 to be actuated to the second or actuated position. This condition is best shown in the Figures 7 and 8. The first and second switch means 49 and 50 are adapted to control an electrical control means 40. The electrical control means 40 is in turn adapted to control the operation of the second drive means 53, and also the first drive means 34 which, as hereinbefore stated, provides means for moving the tracer assembly in a line parallel to the alignment of the first and second scanning means 46 and 47.

The Figure 13 diagrammatically illustrates a simple form of electrical circuit wherein the first and second switch means 49 and 50 control the electrical control means 40. A voltage source 41 is adapted to supply a potential difference to the electrical control means 40 through the first and second switch means 49 and 50. It is to be understood that the first and second switch means 49 and 50 may take any number of a variety of forms, but it has been found that a single-pole single-throw switch for the first switch means 49, and a single-pole double-throw switch for the second switch means 50 will provide the necessary three-speed condition. The diagrammatic circuit as shown in Figure 13 shows the first or normal position of the first and second switch means 49 and 50. This normal position is with the first switch means 49 closed, and the second switch means 50 making contact with an upper contact 42. The second or actuated position of the first and second switch means is shown in Figure 14 and shows the first switch means 49 in an open position, and the second switch means 50 thrown so that the second switch means is in contact with the lower contact 43. When the first and second switch means are in the second or actuated position, the electrical control means 40 is so affected as to cause the drive means 34 to establish a high speed, which in the case of the engine lathe as shown in Figure 16 would be a traverse speed in the outward direction. Such a condition is best shown by the Figures 7, 8 and 14. Such a traverse out or high speed condition is maintained by the drive means 34 until the electrical control means 40 receives a signal of some form to cause a change. Such a signal to cause a change is received when conditions similar to that shown in the Figures 9, 10 and 15, occur. The Figures 9 and 10 show the second contact finger 47 as having passed beyond the first end or shoulder 39 of the straight control surface 33. When the second contact finger 47 passes beyond the end or shoulder 39, it is relieved from operative contact or impingement with this straight control surface 33. The urging of the spring legs 24 thereupon causes the table 26 to return to its normal position, with the second switch means 50 consequently returning to its normal or first position. The Figure 10 shows the first and the second finger means 46 and 47 as being slightly misaligned to illustrate that the second finger means returns to its original position by moving to the left. In the Figure 15 this return of the second switch means 50 to its normal position is depicted by the second switch means 50 contacting the upper contact 42 rather than contacting the lower contact 43 as formerly. The resultant change in the second switch means 50 causes the electrical control means 40 to control the drive means 34 in a different manner, which, in the specific illustration of the engine lathe of Figure 16, would cause an intermediate, slower or feed speed to the outward movement of the cross-slide 37. This would result in a feed-out movement of the cross-slide rather than traverse-out as formerly. The feed-out movement would continue for as long as the second switch means 50 is in the normal position and the first switch means 49 is in the second or actuated position, as illustrated in the Figures 9, 10 and 15. The principal purpose of providing a slower or feed speed to the relative movement of the scanning means and the pattern 48 is to provide a more accurate sizing of this step or shoulder 39 in the pattern 48. In the specific illustration of the engine lathe, such a step or shoulder 39 would cause a shoulder between portions of the workpiece 54 having different diameters. This slower or feed speed would continue until the first finger means 46 passes beyond the first end or shoulder 39 of the straight control surface 33. When the first finger means 46 passes beyond the end 39, the first finger means 46 would no longer be in operative contact or impingement with this straight control surface 33, and therefore the first finger means 46 would be free to move to permit the first switch means 49 to return to its normal or first position. This would mean that both the first and the second finger means 46 and 47 have moved to permit the first and second switch means 49 and 50 to return to the first or normal position, as best illustrated in the Figures 11, 12 and 13. The Figures 11 and 12 show the first and second finger means 46 and 47 to again be in alignment. The change of the first finger means 46 from the second or actuated position to the normal or first position gives another signal to the electrical control means 40 which produces a change in the speed condition of the drive means 34. Under the conditions of Figures 11 and 12, the first finger means 46 in returning to the first or normal position would cause the first switch means 49 to reclose, and therefore the circuit condition would be as illustrated in the Figure 13. This third operating condition of the drive means 34 could be a zero speed condition of the drive means 34. Such a condition is utilized in the specific example of the engine lathe wherein as the first finger means drops off the end 39 of the straight control surface 33, the outward movement of the cross-slide 37 is terminated. Other means, such as the second drive means 53, could then be provided for moving the carriage 36 in a leftwardly direction to thereby cut the workpiece in a larger diameter. The resultant effect of the first and second scanning means 46 and 47 of the tracer assembly 45 is such that, when applied to an engine lathe, the cross-slide 37 will move rapidly outward in a traverse-out speed, until only a short distance from the end 39 of the straight control surface 33 of the pattern 48. The cross-slide is then slowed down to a slow or feed-out speed for the last few thousandths of an inch so that extreme accuracy may be obtained in the sizing of the next diameter to be turned on the workpiece. When the end 39 is reached by the first scanning means 46, and it in turn drops off this end 39, the feed-out movement of the cross-slide is ended, thereby accurately sizing or gauging the diameter of this workpiece. The change in speed is made to occur just prior to the completion of scanning the straight control surface 33, so that the rapid speed of traverse-out is reduced to a slow speed of feed-out, and thereby accurate measurement of the total length of the straight control surface 33 is accomplished.

The Figures 13, 14 and 15 show a braking means 59 for the first drive means 34, and a braking means 60 for the second drive means 53. The braking means 59 could be utilized to brake the drive means 34 between the traverse-out and feed-out condition, or between the feed-out and zero-speed conditions, or both. Likewise the braking means 60 could be used to brake the drive means 53 as it is rendered inoperative.

At the beginning of the explanation of the preferred embodiment of the invention, the statement was made that this preferred embodiment was being shown as being used with an engine lathe, although it was to be understood that this was not a limitation, but merely an example. The tracer assembly as shown may easily be used to control three speed conditions of the carriage of a lathe, rather than the cross-slide of the lathe. The Figure 17 diagrammatically shows the tracer assembly, and consequently the first and second finger means, positioned at right angles to the position of the tracer assembly as shown in Figure 6, wherein the tracer assembly and pattern were positioned to obtain accurate sizing of the diameters of the workpiece 54. The Figure 17, which shows the first and second contact fingers 46 and 47 aligned in a direction parallel to the movement of the carriage 36 of the lathe 35, will then be able to provide a three-speed condition to the carriage 36 of the lathe 35, rather than to the cross-slide 37. Such a positioning of the first and second contact fingers 46 and 47 relative to the pattern 48 would be useful where the workpiece is what is known as a faceplate, wherein accurate distances between faces of the successive diameters are the important dimensions to be accurately sized.

The Figure 18 shows how the control system of the present invention may be adapted for use in a step-boring operation. For this operation, the first and second finger means 46 and 47 are reversed, or positioned 180° from the position shown in the Figure 6. The pattern 48 necessarily has the various steps for variations on the back side of this pattern 48; that is, the side away from the operator of the lathe. With the first and second finger means 46 and 47 positioned relative to the pattern 48 as shown in the Figure 18, such a step-boring operation as depicted by the cutting of the workpiece as shown in Figure 18 may readily be accomplished by the tracer assembly 45 as disclosed in this specification.

The Figure 19 shows that it is clearly feasible to use the tracer assembly 45 on a pattern that has control surfaces that are not parallel with either the movement of the cross-slide or the movement of the carriage. The pattern 61 has a tapered surface 62 and a curved surface 63. When the first finger means 46 strikes the tapered surface 62 or curved surface 63, only that first finger means 46 will be moved to actuate only the first switch means 49, leaving the second switch means 50 in its normal position. As previously explained, the feed-left movement of the carriage would be interrupted by the actuation of the first switch 49, and the feed-out condition would be instituted. Upon the feed-out movement of the cross-slide 37, it will readily be seen that the first finger means 46 will be relieved from operative contact with the tapered surface 62, therefore causing the electrical control means 40 to provide for feed-left of the carriage 36 once more. Such alternate conditions of feed-left and feed-out would continue, providing minute steps that would be the mean of the slope of the tapered surface 62. It will be noted that there is no actuation of the second finger means 47 upon the tapered surface 62, and therefore the traverse-out speed of the cross-slide 37 is never instituted under these conditions. The same conditions of feed-left and feed-out would apply for the curved surface 63, such feed-left and feed-out conditions again providing minute steps that would be the mean of the curve as governed by the curved surface 63.

The invention may be carried one step further, and the electrical control means 40 may be utilized for controlling three speed conditions of both the carriage and the cross-slide of the lathe. The tracer assembly 45 need be modified only slightly to provide for this increased flexibility of the control system, and the Figure 20 shows a simplified side view of the tracer assembly 45 which view is similar to the side view shown in Figure 2. The Figure 20 shows that a third switch means 64 has been incorporated as part of the tracer assembly 45, and is adapted to be actuated by the second finger means 47. This third switch means could be shown to be actuated by the first finger means 46 with just as satisfactory results, and therefore this embodiment in this modification is shown merely by way of example and not as a limiting feature.

The Figure 20 shows a modification of the tracer assembly 45 wherein the post 31 actuates a third switch means. The third switch means 64 has been shown as an enclosed switch similar in type to the second switch means 50. The third switch means 64 has an actuating member 65 which is in a normally non-depressed position and which is urged outwardly from the enclosing casing by some form of spring means. In this modification, the table 26 will have three positions of movement, the first position being the normal position wherein neither finger means 46 or 47 is in contact with the pattern 48, and therefore both tables 25 and 26 are depending vertically or in alignment with the first and second support insulators 22 and 23. The electrical conditions of the switch means will then be that as shown diagrammatically in the Figure 21, with all three switch means in the normal or non-actuated position. When the table 26 is moved to the right by operative contact of the second finger means 47 with the pattern 48 as viewed in the Figure 20, there will be an intermediate or second position of the table 26 as shown in the Figure 22 wherein the post 31 is not depressing either of the actuating members 29 or 65. In this intermediate position, the second switch means 50 will be in its second or actuated position, and the third switch means 64 will still be in its normal or non-actuated position.

This second or intermediate position of the table 26 which is provided by impingement or operative contact by the second finger means 47 with the pattern 48 will cause a different electrical condition of the second switch means 50, which will govern the electrical control means 40 in a different manner, and therefore the rate of movement of the carriage 36 may be slowed down to a sizing speed or feed-left slow, such that very good accuracy may be obtained in the sizing of lengths of the cylindrical surfaces of the workpiece 54 as cut by the tool 57. The changed electrical condition is shown in the Figure 23, which diagrammatically depicts a portion of the electrical control circuit first diagrammatically shown in Figure 13. The circuit diagram of Figure 23 shows the third switch means 64 as well as the first and second switch means 49 and 50 which in combination control the electrical conditions of the electrical control means 40. The Figure 23 differs from the circuit of Figure 21, in that the switch 50 has moved from the first or non-actuated position to the second or actuated position, and the first switch means 49 has opened, or been moved to the actuated position. As was stated above, this changed electrical condition may be employed to effect a feed-left slow or sizing speed of the leftward movement of the carriage 36. This leftward movement of the carriage 36 will cause the first and second finger means 46 and 47 to be pressed with even greater force against the straight control surface 33 of the pattern 48, and therefore the tables 25 and 26 will be urged even farther out of alignment with the first and second support insulators 22 and 23. This further misalignment of the table 26 will eventually reach a third position of this table 26 wherein the post 31 depresses the actuating member 65 of the third switch means 64 to thereby actuate this third switch means 64. This condition is shown in the Figure 24 and the electrical circuit is diagrammatically shown in the Figure 25, which shows the third switch means 54 in the actuated position. This third position of the table 26, with the consequent actuation of the third switch means 64 causes another electrical condition to be impressed upon the electrical control means 40, which in this modification of the invention has been chosen to show that the feed-left movement of the carriage is stopped, and the traverse-out or high speed condition of the cross-slide 37 instituted. From this point on in the cycle of operation, the operation of the control system may be adapted to continue substantially as described previously. The traverse-out movement of the cross-slide 37 would be permitted to continue as long as the first and second finger means 46 and 47 are both in contact with the straight control surface 33, as shown in Figures 8 and 9. When this traverse-out movement of the cross-slide 37 causes the second finger means 47 to be driven beyond the end 39 of the straight control surface 33, then the conditions shown in Figures 9 and 10 will prevail, and the electrical circuit conditions will change since this second finger means 47 is relieved from operative contact with this straight control surface 33, and the table 26 will be permitted to return to its first position, or normal position. Therefore the post 31 will depress the actuating member 29 to cause the second switch means 50 to return to its normal or non-actuated position. The electrical circuit conditions will then be as shown in the Figure 27, with the second and third switch means 50 and 64 in their normal or non-actuated positions. This electrical condition will cause the electrical control means 40 to provide for the feed-out or slow speed condition of the cross-slide 37, which as previously stated, provides for accurate sizing of the various diameters of the workpiece 54 by the tool 57.

The feed-out condition of the cross-slide 37 will continue as long as the first finger means 46 is in operative contact with the straight control surface 33 and the second finger means 47 is out of contact with this straight control surface 33. When the first finger means 46 is relieved from operative contact with the straight control surface 33, that is, by passing beyond the end 39 of this straight control surface 33, the condition will be that as shown in Figures 11 and 12, and as in the Figure 20, wherein both tables 25 and 26 are returned to their normally aligned position underneath the first and second support insulators 22 and 23. Since the first finger means 46 is no longer operatively contacting the straight control surface 33, the table 25 will be returned to its normal condition, to thereby close the first switch means 49; therefore the electrical conditions will again be that as shown diagrammatically in Figure 21. It will thus be seen that the tracer assembly 45 as shown in Figure 1 may easily be modified by the addition of the third switch means 64 to thereby provide for three speed conditions of the carriage 36 as well as three speed conditions for the cross-slide 37 by only a slight modification of the control system as disclosed in the present application.

The second drive means 53 drives the carriage 36, and the braking means 60 is provided for braking this second drive means 53. In this modification of the control system wherein the third switch means 64 is utilized to provide three speed conditions to the carriage 36, this braking means 60 may be adapted to provide braking to the second drive means 53 between the feed-left condition and the feed-left slow condition, and may provide braking between the feed-left slow condition and the zero speed condition.

Although the present disclosure has been made with the tracer assembly 45 mounted on the cross-slide 37, and the pattern 48 is mounted on the bed of the lathe 35, it will be obvious that the positions of the two elements may readily be reversed, as long as there is relative movement between the pattern 48 and the tracer assembly 45, and such a change is entirely within the scope of the instant disclosure.

Although the invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tracer device comprising, a base, a first and a second finger, a first group of four leaf-spring legs dependently supporting said first finger from said base, a second group of four leaf-spring legs dependently supporting said second finger from said base with said second finger disposed closely adjacent said first finger, said spring legs defining only parallel planes to establish movement of said fingers only in a direction substantially perpendicular to said planes, said first and second fingers lying parallel and defining a given plane substantially parallel to said parallel planes, a single pole single throw normally closed switch actuable to an open position by movement of said first finger from said given plane, and a single pole double throw switch actuable by movement of said second finger from said given plane.

2. A tracer device comprising, a base, a first and a second table, a first group of four leaf-spring legs dependently supporting said first table from said base, a second group of four leaf-spring legs dependently supporting said second table from said base and with said second table disposed closely adjacent said first table, said spring legs defining only parallel planes to establish movement of said tables only in a direction substantially perpendicular to said planes, a first finger dependently carried by said first table in an adjustably fixed position, a second finger dependently carried by said second table in an adjustably fixed position closely adjacent said first finger, said first and second fingers lying parallel and nominally defining a given plane substantially parallel to said parallel planes, a single pole single throw normally closed switch actuable to an open position by movement of said first finger from said given plane, and a single pole double throw switch actuable by movement of said second finger from said given plane.

3. A tracer device for use with a pattern having first and second angularly related traceable surfaces, said tracer device comprising, a base, a first and a second table, a first group of four leaf-spring legs dependently supporting said first table from said base, a second group of four leaf-spring legs dependently supporting said second table from said base with said second table disposed closely adjacent said first table, said spring legs defining only parallel planes to establish movement of said tables only in a direction substantially perpendicular to said planes, a first finger dependently carried by said first table in an adjustably fixed position, a second finger dependently carried by said second table in an adjustably fixed position closely adjacent said first finger, said first and second fingers lying parallel and nominally defining a given plane substantially parallel to said parallel planes and substantially parallel to said first traceable surface, said second finger adapted to lie closer to said second traceable surface than said first finger, a single pole single throw normally closed switch actuable to an open position by movement of said first finger from said given plane, and a single pole double throw switch actuable by movement of said second finger from said given plane to a first position.

4. A tracer device for use with a pattern having first and second angularly related traceable surfaces, said tracer device comprising, a base, a first and a second table, a first group of four leaf-spring legs dependently supporting said first table from said base, a second group of four leaf-spring legs dependently supporting said second table from said base with said second table disposed closely adjacent said first table, said spring legs defining only parallel planes to establish movement of said tables only in a direction substantially perpendicular to said planes, a first finger dependently carried by said first table in an adjustably fixed position, a second finger dependently carried by said second table in an adjustably fixed position closely adjacent said first finger, said first and second fingers lying parallel and nominally defining a given plane substantially parallel to said parallel planes and substantially parallel to said first traceable surface, said second finger adapted to lie closer to said second traceable surface than said first finger, a single pole single throw normally closed switch actuable to an open position by movement of said first finger from said given plane, a first single pole double throw switch actuable by movement of said second finger from said given plane to a first position, and a second single pole double throw switch actuable by movement of said second finger to a second position more remote from said given plane than said first position.

CLAUDE E. GREENE.
ROBERT B. LESHER.

REFERENCES CITED

The following references are of record in the file of this patent:

UNITED STATES PATENTS

| Number | Name | Date |
|---|---|---|
| 2,025,748 | Howe | Dec. 31, 1935 |
| 2,112,682 | Ryder | Mar. 29, 1938 |
| 2,422,682 | Johnson | June 24, 1947 |
| 2,436,373 | Barnes | Feb. 24, 1948 |

FOREIGN PATENTS

| Number | Country | Date |
|---|---|---|
| 505,470 | Great Britain | May 11, 1939 |
| 847,177 | France | Oct. 4, 1939 |